United States Patent [19]
Murphy et al.

[11] Patent Number: 4,542,679
[45] Date of Patent: Sep. 24, 1985

[54] MULTIPLE LOOP CONTROL SYSTEM

[75] Inventors: Milford R. Murphy, Arlington; Delbert E. Haskins, Irving, both of Tex.

[73] Assignee: Textron Inc., Providence, R.I.

[21] Appl. No.: 562,068

[22] Filed: Dec. 15, 1983

Related U.S. Application Data

[63] Continuation-in-part of Ser. No. 234,713, Feb. 17, 1981, Pat. No. 4,436,018.

[51] Int. Cl.[4] .............................. F15B 9/03; F15B 9/09
[52] U.S. Cl. ...................................... 91/363 A; 91/509
[58] Field of Search ..................... 91/363 A, 509, 513, 91/522; 318/564, 565; 244/178, 194

[56] References Cited

U.S. PATENT DOCUMENTS

| | | | |
|---|---|---|---|
| 3,462,660 | 8/1969 | Barltrop | 318/18 |
| 3,496,836 | 2/1970 | Jenney | 91/509 |
| 3,665,809 | 5/1972 | Walker et al. | 91/363 A |
| 3,898,916 | 8/1975 | Renner et al. | 91/509 |
| 4,143,583 | 3/1979 | Bauer et al. | 91/1 |

FOREIGN PATENT DOCUMENTS

| | | |
|---|---|---|
| 853674 | 11/1960 | United Kingdom . |
| 886228 | 1/1962 | United Kingdom . |
| 2000609 | 1/1979 | United Kingdom . |

Primary Examiner—Paul E. Maslousky
Attorney, Agent, or Firm—Richards, Harris, Medlock & Andrews

[57] ABSTRACT

A redundant, dual-fail/operate fly-by-wire control system actuates a redundant tandem piston actuator (10) to provide a single composite output evidenced by movement of a piston rod (12). The basic fault-tolerate actuation system consists of dual hydraulic primary actuators, quadruplex electrical control loops (14-17), and control servo valves (22-25). A failure management system connects to the actuation system by means of lines (18-21) to control the servo valves (22-25). The four control loops (14-17) connect to a pilot controller that provides a pilot individual input signals to amplifiers (26-29) for each of the control loops. A tracking loop (450) includes switches (480, 482, 484) for connecting the four control loops (14-17) and providing isolation therebetween.

16 Claims, 8 Drawing Figures

MULTIPLE LOOP CONTROL SYSTEM

RELATED APPLICATION

This application is a continuation-in-part application of U.S. patent application Ser. No. 234,713, filed Feb. 17, 1981, entitled "Multiple Loop Control System" and now U.S. Pat. No. 4,436,018.

TECHNICAL FIELD

This invention relates to a multiple loop actuation system with failure management, and more particularly to a multiple loop actuation system providing multiple loop failure operation through the utilization of failure management.

BACKGROUND ART

The term "fly-by-wire" has become recognized in the aircraft control art as describing systems for aircraft control using electronic or electrical control paths. That is, electronic or electrical control paths replace the mechanical or hydraulic control paths of previous aircraft control systems. Although it has been recognized for sometime that electrical control systems offer advantages over previous mechanical or hydraulic controls, there has been a reluctance to utilize electronic systems because of the belief that a mechanical linkage, for example, provides a more reliable system. Thus, most fly-by-wire control systems employ multiple signal paths each independently capable of carrying control signals for safe operation of the aircraft. If one or more of the electrical control paths is damaged, the remaining paths will function to provide signals for operation of the aircraft. This need for redundant control is particularly important in military aircraft where battle damage may disrupt one or more of the complete paths. For additional protection against battle damage, it is often a requirement of aircraft specifications that each of the multiple control paths be run through different parts of the aircraft.

Fly-by-wire control systems have received much recent attention in research and development efforts throughout the industry. The desire for improved survivability is a strong incentive for this effort. Also, more precise control for nap-of-the-earth flight and the desire to couple guidance and navigation controllers to the actuation system of an aircraft makes fly-by-wire techniques assume additional advantage over mechanical or hydraulic control systems.

Typical of fly-by-wire control systems is that described in U.S. Pat. No. 4,274,808 issued June 23, 1981, for helicopter control. While the present invention is directed primarily to helicopter control, it will be understood that the invention is applicable to all aircraft control.

It was early recognized that fly-by-wire control systems must be fail operate, that is, the system must continue to operate after multiple path failures. In the systems hereinafter described, the actuation system includes four control loops and the system must continue to operate after two control loop failures. This is to provide reliability such that the vehicle (aircraft) be substantially immune to catastrophic failures which might result in loss of life and/or destruction of the aircraft. In the system to be described, to provide "two-fail-operate" capability the system includes redundancy of electrical and hydraulic power supplies, sensors, electronics, signal paths, and actuating devices.

DISCLOSURE OF THE INVENTION

In accordance with the present invention, a basic fault-tolerate actuation system includes a primary actuator, multiple electrical control loops, and a failure management system. The failure management system complements the control loops to provide a control system with a failure tolerance level of multiple fail/operate. The actuation system of the present invention can be characterized by fundamental simplicity and an inherent ability to tolerate failure; the system of the present invention is a forgiving-type system.

A multiple channel system, in accordance with the present invention, provides a single composite output from a multiple actuator system. Each actuator, the actuators may all be coupled to the same output shaft, is controlled by multiple control loops each of which receives a separate control signal. The individual actuators generate an output combined with the outputs of other actuators to provide the single composite output. Each control loop responds to an individual input signal and generates a control signal to the interconnected actuator. Connected to each of the actuators is a failure monitor that monitors the operation of the actuators and provides a disengagement signal to a failed control loop. The failure monitor also provides alignment signals for each of the actuators. Each control loop includes a tracking loop for providing isolation between control loops resulting in an improved failure monitor system.

BRIEF DESCRIPTION OF THE DRAWINGS

A more complete understanding of the invention and its advantages will be apparent from the following detailed description taken in conjunction with the accompanying drawings.

Referring to the drawings.

DETAILED DESCRIPTION

Figure 1:
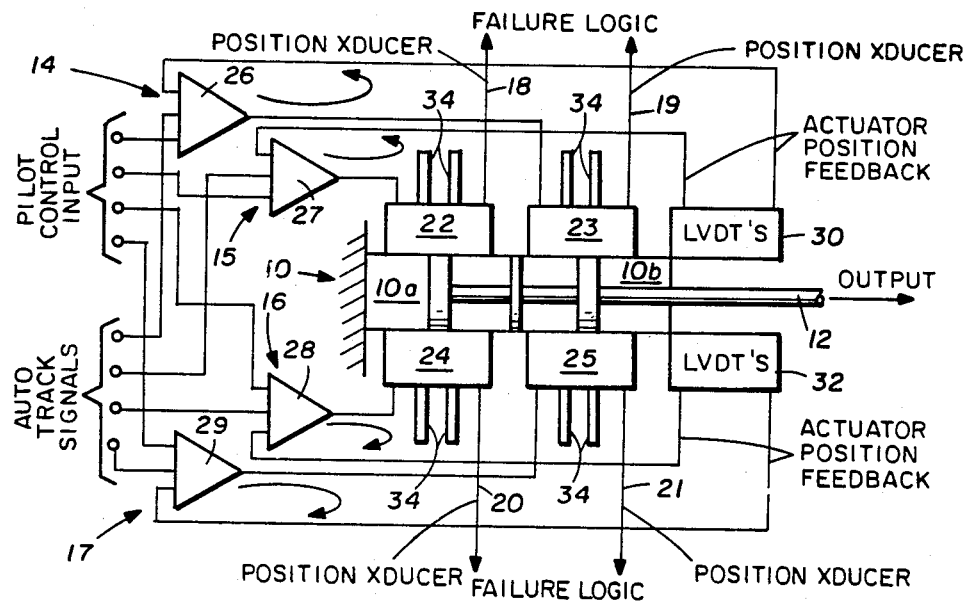
FIG. 1 is a block diagram of a four loop fault-tolerate actuation system with actuators in the form of redundant tandem pistons.
Figure 2:
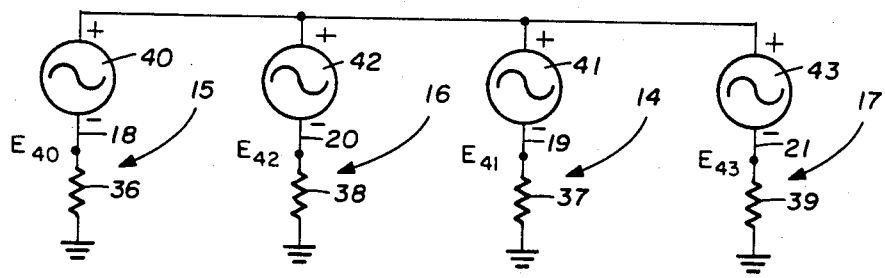
FIG. 2 is a simplified schematic for explanation of the operation of a fault management system for sensing the failure of one loop of a four loop actuation system.

Referring to FIG. 1, there is shown a redundant, dual-fail/operate fly-by-wire control system utilizing a redundant tandem piston actuator 10 providing a single composite output evidenced by movement of a piston rod 12. The basic fault-tolerate actuation system of FIG. 1 consists of dual hydraulic primary actuators 10a and 10b and quadruplex electrical control loops 14–17 that include servo valves 22–25. Referring to FIG. 2, there is illustrated a basic failure management system connected to lines 18–21 of FIG. 1. The failure management system, as illustrated in FIG. 2, is mechanically interfaced with the electrical control loops 14–17 by means of valve position transducers (linear voltage differential transformers) as part of each of the electrical hydraulic servo valves 22–25 connected to receive a control signal from one of the control loops 14–17.

The four control loops 14–17 connect to a pilot controller (not shown) that provides pilot individual input signals to the loops as applied to amplifiers 26–29. Typically, the pilot control unit utilizes four transducers for the actuation system of FIG. 1. Each transducer generates individual input signal which are applied as an input to one of the amplifiers 26–29. Also applied as input signals to the amplifiers 26–29 are four separate signals from an automatic tracking system of a conventional configuration for a fixed wing aircraft or a helicopter.

Also supplied to the actuation system of FIG. 1 is pressurized hydraulic fluid applied to the lines 34 connected to the electrohydraulic servo valves 22–25.

Also included as a part of the actuation system of FIG. 1 are actuator position feedback transducers 30 and 32 (linear voltage differential transformers) each providing two outputs varying with the position of the piston rod 12. Each of the actuator position feedback signals from the transducers 30 and 32 are connected individually to one of the amplifiers 26–29. Thus, the actuator 10 is slaved to the pilot's control input.

As illustrated, the control loops of the actuation system are essentially identical and operate simultaneously. A control input to the amplifiers 26–29, either from the pilot control unit or from an automatic tracking system, proportionally opens the servo valves 22–25 and drives the actuator until the actuator position feedback signals from the transducers 30 and 32 cancel the command signals to the amplifiers 26–29. This closes the electrohydraulic servo valves 22–25 and the piston rod 12 assumes a new steady state position. As will be explained, the four servo valves 22–25 are continuously and automatically aligned by a limited authority tracking signal that is provided by the failure management system, such as shown in FIG. 2, on lines 18–21.

Referring to FIG. 2, there is shown a simplified failure management and out-of-track condition system connected to lines 18–21 for the actuation system of FIG. 1. Basically the system comprises resistors 36–39 connected individually to one of the position transducers 40–43, respectively, the latter being a part of the electrohydraulic servo valves 22–25. This circuit configuration allows each of the control loops 14–17 to comparatively monitor itself, determine a failure, and disengage itself.

For normal operation of the actuation system of FIG. 1, the voltages across the valve position transducers 40–43 are substantially equal. Since the voltages across the transducers are substantially equal independent of valve position, there will be no appreciable current in the resistors 36–39. Current will flow in these resistors only when the position of the servo valves 22–25 are not in agreement. If one of the control loops has a "hard-type" failure, the porting stage of the interconnected servo valve will fully displace while the porting stage of the remaining servo valves will partially displace in the opposite direction. A voltage difference will develop across the transducers 40–43 thereby causing a current to develop in one of the resistors 36–39. The current in the resistor associated with the failed control loop will typically be several times higher than the current in the other resistors and, hence, provide the means for identifying the failed loop. For example, if the servo valve 24 of the control loop 16 is hard over, a hard-type failure, the other three servo valves 22, 23 and 25 will be displaced a small amount (depending on the actuator load and the loop gain of the control loops) in the opposite direction and each of the transducers 40, 41 and 43 will produce an output voltage V.

Figure 3:
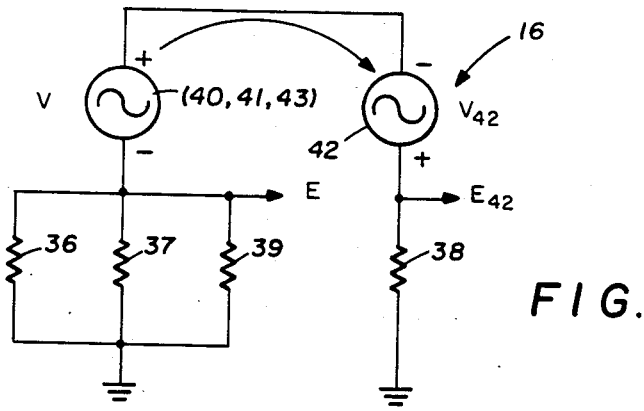
FIG. 3 is a schematic illustrating the equivalent circuit of the fault management system of FIG. 2 when one of the loops is in a failure mode.

Referring to FIG. 3, there is shown an equivalent circuit for the failure management system and out-of-track condition of FIG. 2 for the actuation system of FIG. 1 where a failure has occurred in the control loop 16. The voltage from the valve position transducer 42 in the failed control loop 16 will be opposite in polarity from the other three transducers (shown as a composite of one transducer) and, hence, will be in series and will be additive. Under the conditions as illustrated in FIG. 3, the current in the resistor 38 is given by the equation:

$$I_{16} = \frac{(V - V_{42})}{R/3 + R} \quad (1)$$

Where:
R equals the resistance of each of the resistors 36–39,
V equals the voltage from each of the transducers 40, 41 and 43, and
$V_{42}$ equals the voltage output from the transducer 42.
This equation can be rewritten as follows:

$$I_{16} = \tfrac{3}{4} \frac{(V - V_{42})}{R} \quad (2)$$

The resulting current in each of the resistors 36, 37 and 39 is given by the equation:

$$I = \tfrac{1}{4} \frac{(V - V_{42})}{R} \quad (3)$$

That is, the current in each of the resistors 36, 37 and 39 is ⅓ the current of the resistor 38.

The above analysis assumes a first failure in the control loop 16. A second failure in one of the remaining three control loops, for example, the control loop 15, produces a current in the resistor 36 given by the equation:

$$I_{15} = \frac{(V - V_{40})}{R/2 + R} \quad (4)$$

$$= \tfrac{2}{3} \frac{(V - V_{40})}{R}$$

Under the conditions of a failure in loops 15 and 16 the current in the resistors 37 and 39 is given by the equation:

$$I = \tfrac{1}{3} \frac{(V^1 - V_{40})}{R} \quad (5)$$

Where:

$V^1$ equals the voltage output from each of the transducers 41 and 43, and $V_{40}$ equals the voltage output from the transducer 40. That is, the current in resistors 37 and 39 is ½ the current in the resistor 36, the failed loop. The control loop 16 and therefore the resistor 38 have been previously cut out upon the detection of the failure in that loop. In both situations (a failure in loop 16 or a failure in loops 15 and 16), the failure current in the resistor associated with the failed control loop is at a sufficiently high level to be compared with the currents in the resistors of the normally operating control loops to provide a signal for positive identification of a failure or degraded condition.

Figure 4:
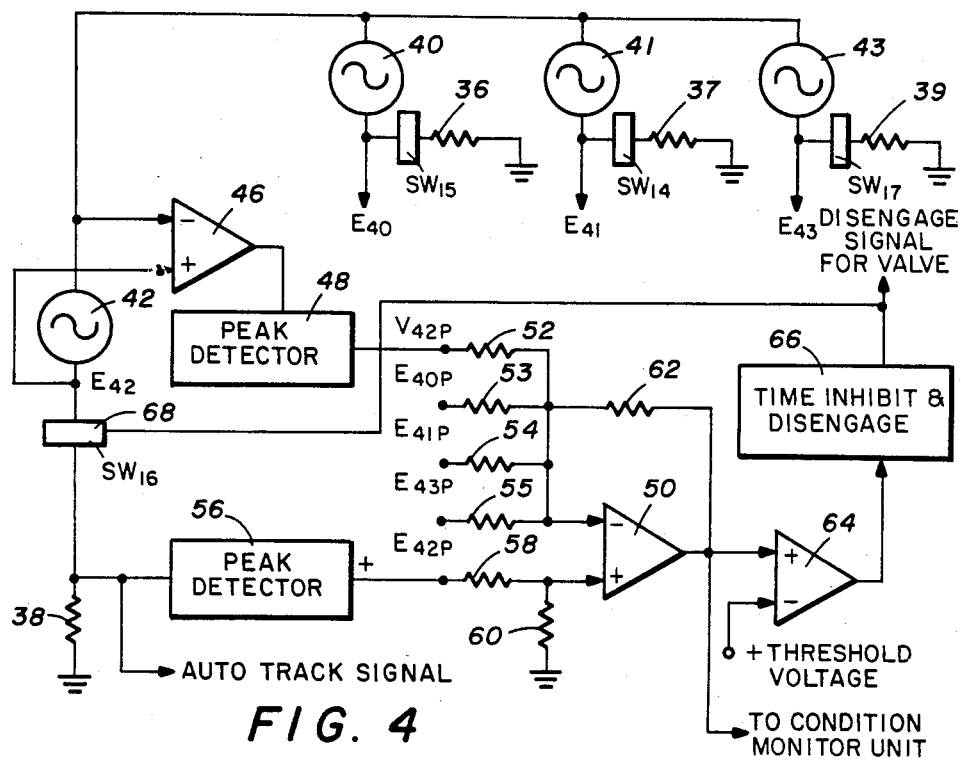
FIG. 4 is a schematic of a fault management system of FIG. 1 with circuitry for inert-type failure detection and disengagement.

Referring to FIG. 4, there is shown one of several approaches for detecting failures and out-of-track conditions in the control loops 14-17. This approach compares the magnitude of the failure voltages across each of the resistors 36-39 with a set threshold. The failure management circuit of FIG. 4 is one of four such circuits connected to the actuation system of FIG. 1.

As illustrated, the circuit of FIG. 4 is connected to the valve position transducer 42 of the control loop 16 which is the condition illustrated by the equivalent circuit of FIG. 3. Each of the other valve position transducers 40, 41 and 43 would be connected to a similar circuit for failure management of each of the control loops 14, 16 and 17. The output of the circuit of FIG. 4 is a disengage signal to disconnect the servo valve 24 from the actuator 10 and the respective failure sensing resistor 38. A similar disengage signal would be generated by each of the other failure management systems associated with the control loops 14, 16 and 17. The automatic disengage function is that part of the failure management system that generates the disengage signal when a failure has occurred to disengage the failed control loop when required.

In the schematic of FIG. 4, the output of the transducer 42 is connected across a differential amplifier 46. This circuitry allows for the detection of inert-type failures and the disengagement at lower signal levels than hard-type failures. The amplifier 46 generates an input signal which is applied to a differential amplifier 50. If there is an inert-type failure in the valve 24, then a zero level signal will be present at the output of the transducer 42 and this zero level signal is peak detected in a peak detector 48 and summed with the fail-sense signals $E_{40P}$, $E_{41P}$ and $E_{43P}$ and compared with a fail-sense signal from a peak detector 56 in the amplifier 50. The fail-sense signals, $E_{40P}$, $E_{41P}$ and $E_{43P}$ are generated in the failure management circuits for the control loops 14, 15 and 17 at the output of the peak detector 56. This summation of the fail-sense signals with the output of the peak detector 48 is basically a voting function. The vote being taken at the inverting input terminal of the amplifier 50.

A disengage signal is generated at the output of the differential amplifier 50 having an inverting input terminal connected to the summing resistors 52-55 and a noninverting input terminal connected to the peak detector 56. The peak detector 56 responds to a voltage generated across the resistor 38. The output of the peak detector 56 is connected to the amplifier 50 through an input resistor 58 that is also connected to a bias resistor 60. The fail-sense signals $E_{40P}$, $E_{41P}$ and $E_{43P}$ are connected to the respective input resistors of the amplifier 50 through peak detectors in a manner similar to the peak detector 56.

To complete the circuit for the amplifier 50, a feedback resistor 62 is connected between the output and the interconnection of the resistors 52-55.

As shown, a hard-type failure signal across the resistor 38 is peak detected in the detector 56 and compared with fail-sense signals from each of the failure management circuits for the control loops 14, 15 and 17. The sum of the fail-sense signals $E_{40P}$, $E_{41P}$ and $E_{43P}$ along with the voltage $V_{42P}$ are compared with the fail-sense signal $E_{42P}$ from the detector 56 in the amplifier 50, which produces an input to the amplifier 64.

For either an inert-type failure or a hard-type failure, the output of the differential amplifier 50 is applied to a noninverting input of a threshold amplifier 64 which has a threshold voltage connected to the inverting terminal. If the failure signal from the comparison amplifier 50 is positive and larger than the threshold voltage, the output of the threshold amplifier 64 will swing from a hard negative voltage to a hard positive voltage. This output of the amplifier 64 is aplied to a time-inhibit and disengage network 66 which includes time delay circuitry. If the failure exists for a preset time period, the time delay circuit of the network 66 generates a disengage signal for the valve 24. In addition, the disengage signal is applied to a switch 68 to disconnect the valve position transducer 42 from the resistor 38 to isolate the failure from further interacting with the failure management system of the remaining operational control loops.

Also output from the comparison amplifier 50 is a monitor signal applied to a condition monitor to indicate to an operator or pilot a fail condition. Still another feature of the circuit of FIG. 4 is the automatic tracking signal produced across the resistor 38. This voltage is applied to an input of the amplifier 28 to keep the servo valve 24 in alignment with the servo valves 22, 23 and 25. As generally known in the art, the term "alignment" means that the four valves 22, 23, 24 and 25 are opened or closed to the same degree for equal flow of hydraulic fluid to the respective actuators. A similar automatic tracking signal will be generated in each of the failure management circuits of FIG. 4 for the remaining control loops 14, 16 and 17 and applied to the respective amplifiers.

The servo valves 22-25 will normally be out of track to some degree because of circuit component tolerances and mechanical misalignments. The voltages $E_{40}$, $E_{41}$, $E_{42}$ and $E_{43}$ can be used directly as driving signals to the respective control loop amplifiers 26-29 to affect an alignment of the servo valves 22-25. This function is made fail-safe by limiting the control authority of the signal to about two percent of the actuator travel.

Under certain conditions, the displacement of the electrohydraulic servo valves 22-25 will be relatively small. If one control loop becomes inert during this condition, the disagreement between the inert control loop failure voltage and the voltages of the operating loops may not be of sufficient magnitude to overcome the set threshold and a disengagement of the inert-type loop will not be affected. Although the inert-type failure could exist for some time without disengaging the failed loop, the fault/tolerate actuation system will continue operating at near normal conditions during this time. If a second failure should occur, the inert-type control loop will be disengaged if it adversely affects the operation of the actuator because of the action of the other valves as explained with reference to FIGS. 2 and 3.

To assure disengagement for inert-type failures at a lower failure signal level than hard-type failures, the circuit of FIG. 4 includes the peak detector 48 coupled to the output of the comparison amplifier 46. As explained, the output of the peak detector 48 is summed with the fail-sense signals $E_{40P}$, $E_{41P}$ and $E_{43P}$ to oppose the failure signal from the peak detector 56. The threshold voltage to the comparison amplifier 64 is set so that a hard-type failure affects a disengagement at about 80 percent valve displacement while an inert-type failure requires only 40 percent valve displacement.

For an inert-type failure, the output of the peak detector 48 is near zero and hence would not be combined with the fail-zense signals from the other control loops to be subtracted from the fail-sense signal from the peak detector 56. Without this opposition, the disengagement threshold is exceeded in the comparison amplifier 64 at a lower value of failure voltage.

As a modification to the circuit of FIG. 4, the amplifier 46, peak detector 48 and resistor 52 are removed from the circuit. This limits the circuit of FIG. 4 to detecting only hard-type failures. Although such a circuit will provide failure management, the feature of inert-type failures provides expanded failure management functions.

Figure 5:
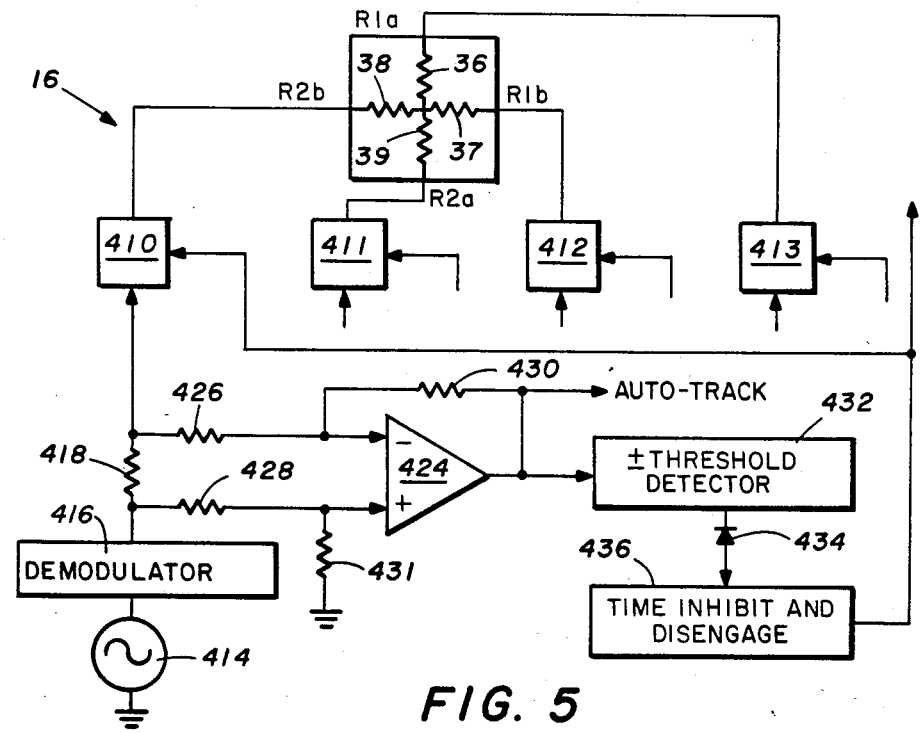
FIG. 5 is a schematic of a fault management system having a common mixing point to effect a voting function.

Referring to FIG. 5, there is shown a circuit for a failure management system wherein the failure sensing circuitry responds only to a failure signal in one of the loops 14–17. The circuitry of FIG. 5 is required for each of the control loops 14–17 and includes the resistors 36–39 which are separately a part of one of the control loops individually connected to one of the valve position transducers 40–43 of FIG. 6. The system of FIG. 5 is implemented by including the resistors 36–39 in a single sealed unit to minimize shorting of the common interconnection to ground or to a voltage line.

Connected to each of the resistors 36–39 is a failure management switch 410–413, respectively. The failure management switch 410 for the control loop 16 is interconnected to a position transducer 414, a linear voltage differential transformer, through a demodulator 416 and a resistor 418.

A voltage generated at the transducer 414 is demodulated in the demodulator 416 to generate a voltage connected to the resistor 418 which is applied to inputs of an operational amplifier 424 through input resistors 426 and 428. Connected to the terminal of the amplifier 424 with the resistor 426 is a feedback resistor 430. Connected to the input terminal of the amplifier 424 at the resistor 428 is a bias resistor 431.

An output of the amplifier 424 is the autotrack signal as described with reference to FIG. 4. This output is also applied to a threshold detector 432 having an output connected through a diode 434 to a time inhibit and disengage network 436. The output of the network 436 is a disengage signal for the control loop 16. The disengage signal from the network 436 opens the switch 410 to isolate a failure in the control loop 16 from further interacting with the failure management system. The output is also applied to disengage the servo valve for the control loop 16. A more detailed schematic of the system of FIG. 5 will be subsequently described with reference to FIG. 7.

Figure 6:
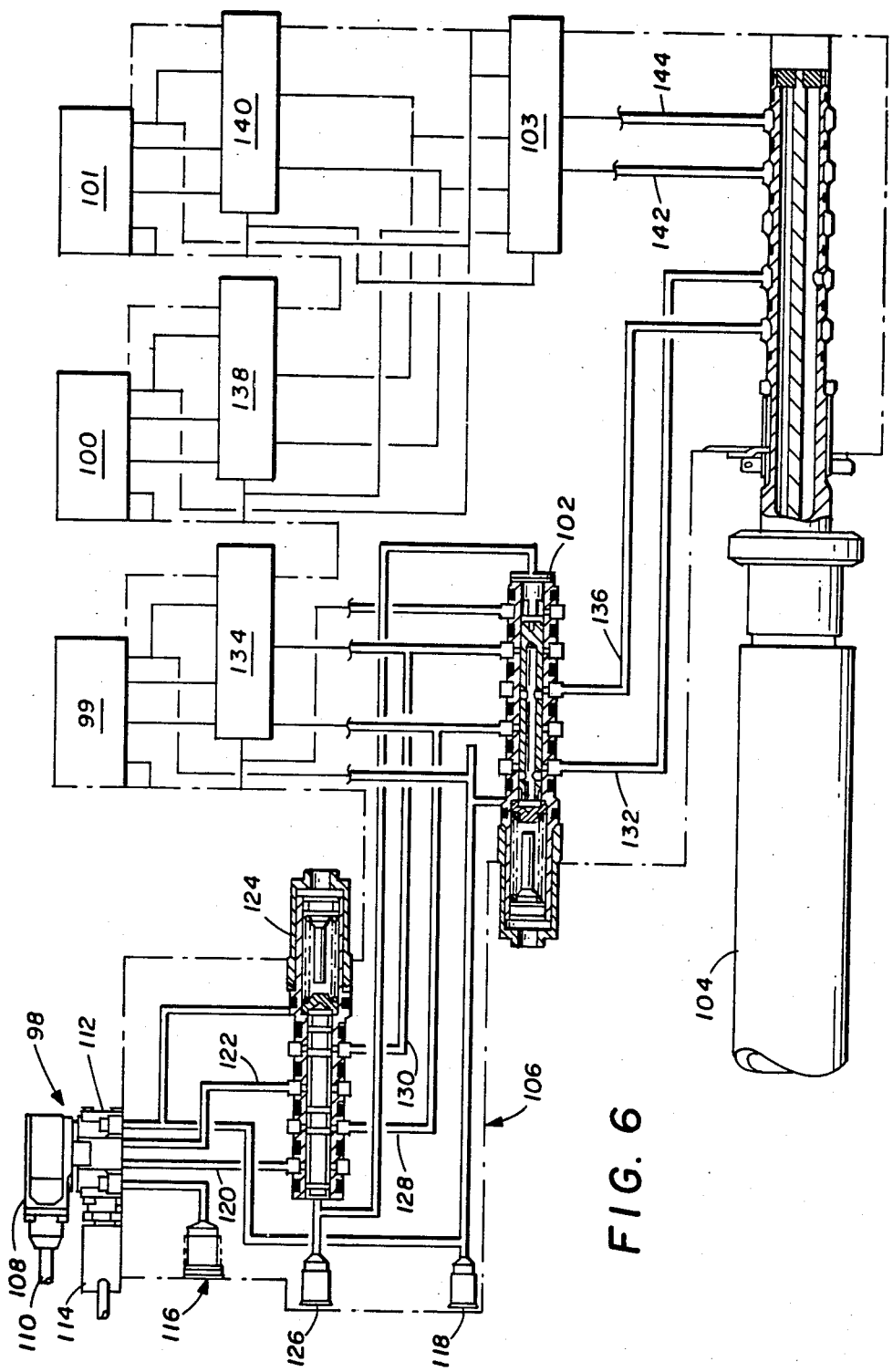
FIG. 6 is a hydraulic schematic of a multi-valve fly-by-wire actuation system utilizing a parallel actuator configuration.

Referring to FIG. 6, there is shown a hydraulic schematic to a multi-valve fly-by-wire actuator system including four electrohydraulic servo valves 98–101. As arranged, the four servo valves are coupled in pairs to bypass valves 102 and 103 each controlling fluid under pressure to a cylindrical actuator 104.

Because of the similarity of the components of the system of FIG. 6, only one of the channels is shown in detail with similar parts represented in block diagram. As shown, the components within the dash-dot outline 106 comprises a multichannel actuation system for controlling the cylindrical actuator 104.

Considering in detail the control loop including the servo valve 98, control signals from a first control loop are applied to a solenoid operator 108 by means of a cable 110. The solenoid operator controls flow of fluid to a valve 112 that includes a valve position transducer 114 which is equivalent to one of the valve position transducers 40–43 of FIG. 2. Hydraulic fluid is supplied to the valve 112 through a port 116 from a fluid source and is returned to a reservoir through a port 118.

Hydraulic fluid is controlled by the valve 112 to lines 120 and 122 connected to an isolation valve 124. The isolation valve 124 is positioned by hydraulic pressure applied to a port 126. With the isolation valve 124 in its normal position, fluid from the valve 112 passes into lines 128 and 130 connected to the bypass valve 102. The bypass valve 102 is a common part of the first and second control channels of the system of FIG. 6 and is also connected to an isolation valve 134 of the second control channel. The valve 134, in turn, is connected to the electrohydraulic servo valve 99. The hydraulic interconnections to and from the valve 99 through the isolation valve 134 to the bypass valve 102 are shown as a single line and are similar to that detailed with respect to the control channel for the servo valve 98.

In operation, the bypass valve 102 responds to a condition of failure in both the first and second control channels to bypass fluid from the actuator 104 thereby rendering the first two control channels ineffective to influence operation of the actuator 104. The normal interconnection of hydraulic fluid from the bypass valve 102 to the actuator 104 is through lines 132 and 136.

The third and fourth control channels of the system of FIG. 6, associated with the electrohydraulic servo valves 100 and 101, respectively, are substantially the same as the first and second control channels associated with the electrohydraulic servo valves 98 and 99, respectively. Connected to the servo valve 100 is an isolation valve 138 which, in turn, is connected to the bypass valve 103. In the fourth control channel, the servo valve 101 controls hydraulic fluid through an isolation valve 140 to the bypass valve 103. The bypass valve 103 is connected by means of lines 142 and 144 to the cylindrical actuator 104.

In operation of the system of FIG. 6, the four electrohydraulic servo valves are connected in individual control loops and receive individual control signals from a control unit. The four control loops are detailed in FIG. 1. During normal operation, the four control signals are combined through the isolation valves 124, 134, 138 and 140 and bypass valves 102 and 103 to control first and second piston actuators (not shown) as a part of the cylindrical actuator 104 to provide a composite signal output, such as a mechanical motion. The first piston actuator is controlled by pressure in the lines 132 and 136, while the second piston actuator is controlled by pressure in the lines 142 and 144.

Assume a failure in the control loop connected to the servo valve 98, then a disengage signal is generated by the circuits of either FIGS. 4 or 5 to actuate a solenoid valve that controls fluid to the isolation valve 124 thereby causing this valve to operate and block the flow of fluid through the lines 120 and 122 to the lines 128 and 130. As previously explained, the disengage signal will also operate a switch to disable the transducer 114 from the failure management systems of either FIGS. 4 or 5. The three remaining control channels associated with the servo valves 99-101 will continue to function to position the cylindrical actuator 104.

Assuming a second failure, and this failure is in the control loop associated with the servo valve 99, a similar sequence occurs to operate the isolation valve 134. This causes the second control channel to be rendered inoperative by disconnecting the servo valve 99 from the bypass valve 102 by operation of the isolation valve 134. At this time, the bypass valve 102 operates to establish a direct connection between the lines 132 and 136 thereby minimizing any interference of the first and second control channels, now in a failure mode, from adversely affecting the cylindrical actuator 104.

If, instead of a failure of the second control loop associated with the servo valve 99, the third control loop associated with the servo valve 100 failed, then the sequence of operation as described with the first control loop and the servo valve 98 will occur. The position transducer for the servo valve 100 will be disconnected from the failure management function and the isolation valve 138 will be operated to disconnect the failed channel from the cylindrical actuator 104. Under this set of conditions, the actuator will then be under the control of the second and fourth control loops associated, respectively, with the servo valves 99 and 101. Both the bypass valves 102 and 103 will be in the normal position allowing a free flow of fluid from the servo valves 99 and 101 to the cylindrical actuator 104.

Thus, the system of FIG. 6 represents one implementation of a four loop fault-tolerant actuation system. Other valve arrangements are, of course, possible with the utilization of solenoid controlled isolation valves and bypass valves well within the knowledge of one skilled in the art.

Figure 7:
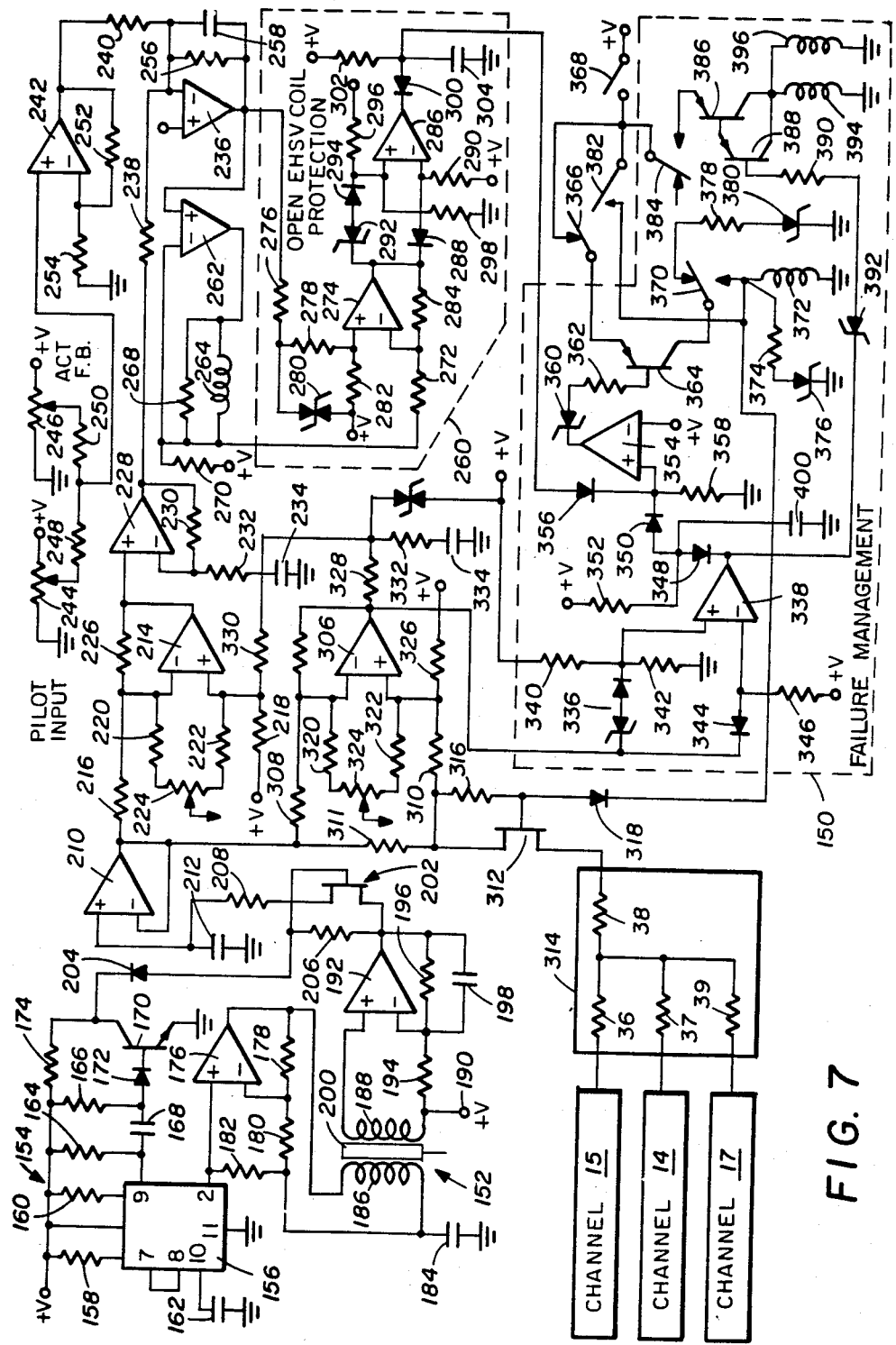
FIG. 7 is a schematic diagram of the fault management system of FIG. 5 with one loop shown in detail for use with the actuators as illustrated in FIG. 1 or FIG. 5.

Referring to FIG. 7, there is shown a schematic of a control loop including failure management circuitry detailed within the dotted outline 150. The circuitry of FIG. 7 follows the embodiment of the invention discussed with reference to FIG. 5. A power supply for driving the electrohydraulic servo valve position transducer 152 includes a 4-kilohertz oscillator 154 consisting of an oscillator chip 156 interconnected to a power supply through resistors 158 and 160. The frequency of the oscillators is established by a capacitor 162 connected to pin 10 of the oscillator chip 156. Pin 9 of the oscillator chip 156 is connected to a filter including resistors 164 and 166 along with a capacitor 168. This filter is tied to the base electrode of a transistor 170 through a diode 172. A drive voltage for the transistor 170 is provided through a resistor 174.

The oscillator chip 156 is also connected to the noninverting input terminal of an operational amplifier 176 having an inverting input terminal connected to a feedback resistor 178 and an input resistor 180. An input resistor 182 also connects to the noninverting terminal of the amplifier 156 and is interconnected to the resistor 180. The interconnection of the resistors 180 and 182 is tied to ground through a capacitor 184.

An output frequency signal from the amplifier 176 is applied to the primary coil 186 of a linear voltage differential transformer comprising the EHSV position transducer 152. The secondary winding 188 of the differential transformer is connected to a power supply at terminal 190 and to one input of an operational amplifier 192. A second input terminal of the amplifier 192 is connected through an input resistor 194 to the terminal 190 and to a feedback loop consisting of a resistor 196 in parallel with a capacitor 198.

In accordance with conventional linear voltage differential transformer operation, positioning of a core element 200 of the transducer 152 produces variation in the output voltage of the transistor 192. This output voltage is applied to a uni-junction transistor 202 having a gate electrode connected to the collector of the transistor 170 through a diode 204. The gate electrode of the transistor 202 is also interconnected to the output of the amplifier 192 through a resistor 206.

A signal produced by operation of the uni-junction transistor 202 is coupled through a resistor 208 to one input of an operational amplifier 210. The resistor 208 also connects to a capacitor 212. An output from the amplifier 210 is connected to one input of a differential amplifier 214 through an input resistor 216. A second input to the amplifier 214 is connected to a power supply through an input resistor 218. Connected to both terminals of the amplifier 214 is an automatic tracking adjustment network consisting of resistors 220 and 222 interconnected to a variable resistor 224.

The differential amplifier 214 is part of a feedback loop for linearizing the electrohydraulic servo valve signal and includes an adjustment circuit network that comprises resistors 220, 222 and the variable resistor 224. A resistor 226 forms the feedback loop for the amplifier 214.

Connected to the output of the amplifier 214 is an amplifier 228 to provide additional amplification and phase compensation to the output of the amplifier 214. Circuitry connected to the amplifier 228 includes a feedback resistor 230 and a resistor 232 in series with a capacitor 234.

An output voltage from the amplifier 228, the linearized signal, is applied to a summing junction connected to one input of an amplifier 236. The summing junction includes resistors 238 and 240, the latter connected to the output of an amplifier 242 as part of the input signal amplification network.

A pilot input signal is generated at the wiper arm of an adjustable resistor 244 and an actuator feedback signal is generated at the wiper arm of an adjustable resistor 246. It should be noted that the resistors 244 and 246 are symbolic of total systems for generating input signals to the circuitry of FIG. 7. The signals at the wiper arms of the resistors 244 and 246 are applied through resistors 248 and 250 to one input of the amplifier 242. The amplifier 242 provides amplification to the input signals and includes a feedback resistor 252 and an input resistor 254.

Connected to the output terminal of the amplifier 236 is a feedback loop consisting of a resistor 256 in parallel with a capacitor 258. This output terminal is also connected to an electrohydraulic servo valve coil protection network 260 and to a driver amplifier 262 for energizing the coil 264 of an electrohydraulic servo valve. In parallel with the coil 264 is a resistor 268 both of which are interconnected to a power supply through a resistor 270.

Also connected to the interconnection of the coil 264 and the resistor 268 is the protection network 260. This connection is made through a resistor 272 to an operational amplifier 274 that also receives an input voltage generated at the output of the amplifier 236. The interconnection between the amplifier 236 and the amplifier 274 is by means of resistors 276 and 278, with the latter in parallel with a voltage protection diode 280. The noninverting input terminal of the amplifier 274 is connected to a power supply and to the diode 280 through a resistor 282. A feedback circuit for the amplifier 274 includes a resistor 284.

Connected to the output of the amplifier 274 is an amplifier 286 with both inputs connected to the amplifier 274 through diode paths. To the inverting terminal of the amplifier 286 there is connected a diode 288 and a resistor 290 and to the noninverting terminal there is connected a Zener diode 292 in series back-to-back with a diode 294. The noninverting terminal is also connected to a divider network consisting of a resistor 296 in series with a resistor 298. An output of the amplifier 286 is applied through a diode 300 to a resistor 302 in series with a capacitor 304. The output generated at the interconnection of the diode 300 with the resistor 302 and the capacitor 304 is applied to the failure management circuitry 150.

Also connected to the output of amplifier 210 is a circuit responsive to signals from each of the channels of the actuator system. This circuitry includes an amplifier 306 connected to the amplifier 210 through a resistor 308 at the inverting input terminal and through a resistor 310 at the noninverting terminal. A transistor switch 312 also connects to the output of the amplifier 210 through a resistor 311. The resistor has a function similar to the resistor 418 of FIG. 5. The transistor switch 312 has one electrode connected to a resistor block 314 that contains resistors 36–39 for each of the control loops as shown in FIG. 6. The resistors 36, 37 and 39 are interconnected, respectively, to channels 14, 15 and 17.

Control of the transistor switch 312 is by voltage produced across a resistor 316 connected in series with a diode 318 and responsive to a disengage signal generated in the failure management circuitry.

Also connected to the amplifier 306 is an adjustment network consisting of a resistor 320, resistor 322 and an adjustable resistor 324. The resistor 322 interconnects to the resistor 310 and to a resistor 326 also tied to a power supply.

An output of the amplifier 306 is connected to an auto tracking network through a resistor 328. The auto tracking network includes the resistor 218 and resistor 330. The latter is connected to a resistor 332 in series with a capacitor 334.

As connected, the output of the amplifier 306 is the effect of summation (the voting function) of the transducer voltages from each of the control loops 14, 15, and 17, with the transducer voltage for the control loop 16 also connected through a demodulator. This is a d.c. mixing function which enables each control loop to include its own oscillator and provides a system that is essentially independent of power supply variation.

With reference to the failure management circuitry 150, an output of the amplifier 306 is input through threshold diodes 336 to one input of an amplifier 338. The input to the amplifier 338 is also tied to a voltage divider network consisting of a resistor 340 in series with a resistor 342. A second input to the amplifier 338 is also connected to the output of the amplifier 306 through a diode 344 and to a positive power supply through a resistor 346.

At the output of the amplifier 338 there is connected a diode 348 connected back-to-back to a diode 350 with the interconnection of the two diodes tied to a positive power supply through a resistor 352. The diode 350 is tied to one input of an amplifier 354 that also connects to the output of the amplifier 286 through a diode 356. The interconnection of the diodes 350 and 356 is connected to an input resistor 358. A second input to the amplifier 354 is tied to a positive power supply. Connected to the output of the amplifier 354 is a Zener diode 360 having an anode electrode connected through a resistor 362 to the base electrode of a switching transistor 364.

Tied to the emitter electrode of the transistor 364 is a momentary contact switch 366 identified as a channel disengage switch. This switch is normally closed and connected to the positive terminal of a power supply through a power switch 368. Connected to the collector electrode of the transistor 364 is a single pole-two position contact 370 as part of a relay including a relay coil 372. the relay coil is in a parallel configuration with a resistor 374 in series with a Zener diode 376. The second terminal of the two position contact 370 is tied to a resistor 378 in series with a Zener diode 380. Also connected to the relay coil 372 is an engage switch 382 and the diode 318 connected to the switch 312. The momentary contact switch 382 connects to the power switch 368 along with a channel control relay including a single pole-two position switch 384 having one terminal connected to the emitter electrode of a transistor 386.

Connected in a Darlington configuration with the transistor 386 is a transistor 388 having a base electrode connected through a resistor 390 and a Zener diode 392 to the output of the amplifier 338. The collector electrode of the transistors 386 and 388 are interconnected to a relay coil 394 and a solenoid coil 396 associated with the hydraulic servo valve of control loop 16.

To actuate the control loop 16, the operator closes the power switch 368 and momentarily closes the switch 382 which is normally open. Closing the switch 382 energizes the relay coil 372 thereby transferring the control loop into an operational mode. At this time, the relay 372 also closes the contact 384 energizing the coil for the electrohydraulic servo valve 24 for the control loop 16 and also energizing the switch 410 (see FIG. 5) by energization of the relay coil 394.

The circuitry of FIG. 7 operates to monitor the valve position feedback transducer 152 and when a failure is detected, sequences the operation of the failure management circuitry to generate an output at the amplifier 338. By operation of a time delay, including the capacitor 400, the transistor 364 is turned off to deenergize the relay coil 372 thereby returning the contact 370 to the position shown and causing the contact 384 to assume its illustrated position. This is the disengage signal because operation of the contact 384 deenergizes the coils 394 and 396. The latter disconnecting the hydraulic servo valve 24 from the actuation system and the former disconnecting the control loop 16 from the failure management function.

Figure 8:
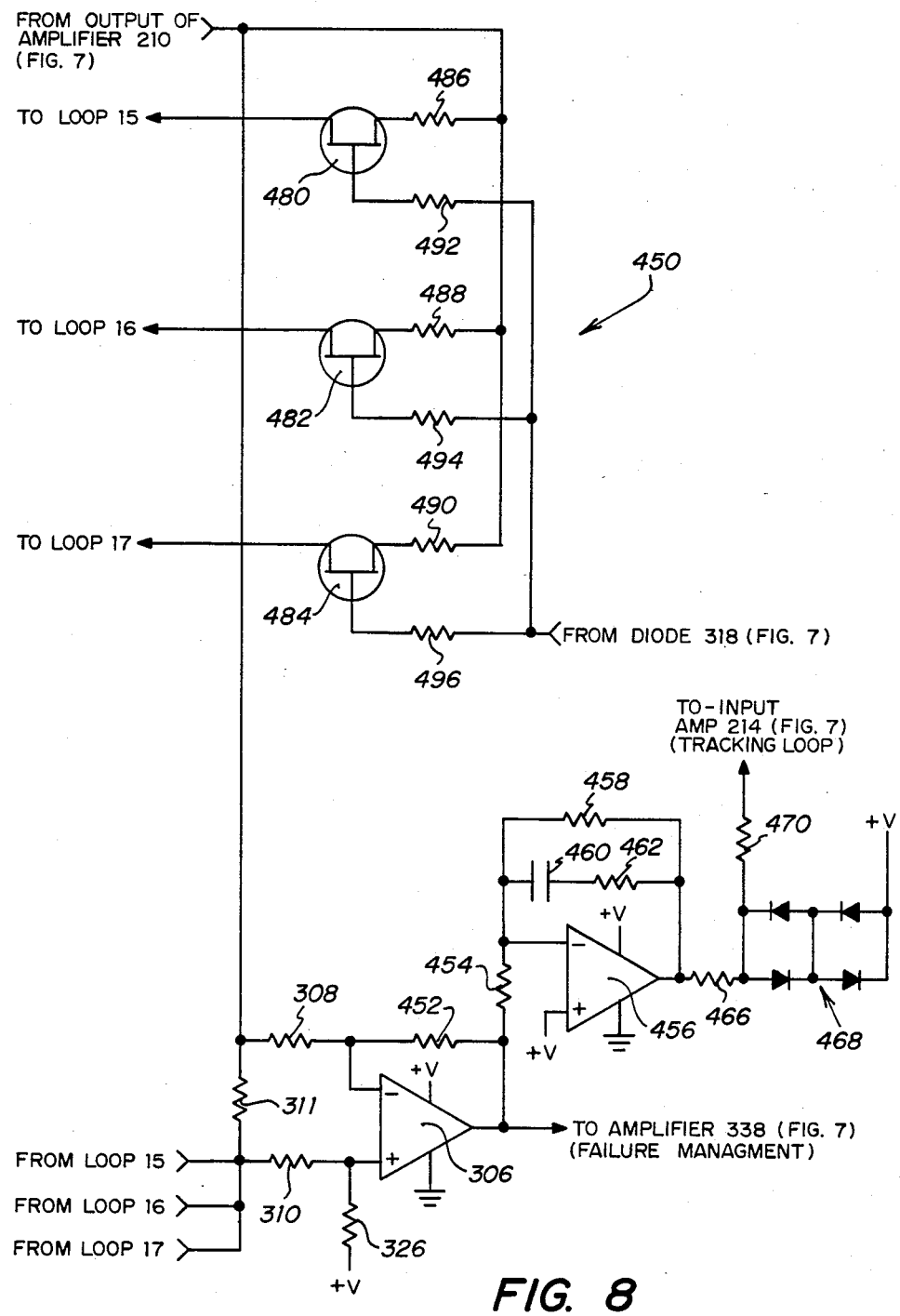
FIG. 8 is a schematic diagram of a reconfiguration of the fault management system of FIG. 5 for use with the loop circuitry of FIG. 7 of the present invention.

Referring simultaneously to FIGS. 7 and 8, the electrohydraulic servo valve tracking loop of the present invention will now be described. The improvement of the present invention as illustrated in FIG. 8 is utilized with a control loop of FIG. 7 which follows the embodiment of the invention discussed with reference to FIG. 5. Like numerals are utilized in FIG. 8 for corresponding components previously identified with respect to FIG. 7.

The present tracking loop is generally identified by the numeral 450 and functions to provide fault isolation and tracking between each of the four loops or channels 14, 15, 16 and 17. For purposes of discussion, it will be assumed that the tracking loop 450 associated with loop 14 is illustrated in FIG. 8. Each loop 14–17 receives inputs from each of the other loops. Additionally, each loop 14–17 generates an output to each of the other three loops. Tracking loop 450 provides circuitry for interfacing between loops 14–17 to provide improved fault management. Tracking loop 450 is utilized to synchronize the output stage of the respective electrohydraulic servo valve with the other electrohydraulic servo valves which prevents flow/force flight and, therefore provides a well defined null impedance.

The output of amplifier 210 outputs signals to loops 15, 16 and 17 and amplifier 306 (FIG. 7). Amplifier 306 is interconnected to amplifier 210 through a resistor 308 at the inverting input terminal and through a resistor 310 at the noninverting input terminal of amplifier 306. A feedback resistor 452 is interconnected between the inverting input and output of amplifier 306.

The output of amplifier 210 is also applied to a resistor 311 which also receives the outputs of loops 15, 16 and 17, it being understood that the loop illustrated in FIG. 8 is loop 14. The differential voltage generated across resistor 311 provides the input to the tracking loop and the failure management loop (FIG. 7). Resistor 311 has a function similar to resistor 418 of FIG. 5.

The output of amplifier 306 is applied to amplifier 338 (FIG. 7) as well as through a resistor 454 to the inverting input of an amplifier 456. Amplifier 456 includes a feedback network including a resistor 458 and a series connected capacitor 460 and resistor 462 interconnected between the inverting input and output of amplifier 456. Amplifier 456 and associated components functions as a lag-lead network.

The output of amplifier 456 is applied through a resistor 466 to a diode limiting network 468. The output of diode limiting network 468 is applied through a resistor 470 the noninverting input of amplifier 214 (FIG. 7) such that the output of amplifier 456 is summed with the electrohydraulic servo valve positioned feedback loop as described with respect to FIG. 7.

An additional aspect of the present tracking loop 450 is the use of three cross strap FET switches 480, 482 and 484 which are used to inform the other control loops 15–17, respectively on the position of the electrohydraulic servo valve of loop 14. The output of amplifier 210 (FIG. 7) is applied to the drain of FET 480 through a resistor 486, to the drain of FET 482 through a resistor 488 and to the drain of FET 484 through a resistor 490. The source of FETs 480, 482 and 484 generate the output to the other three control loops 15–17. The gate terminals of FETs 480, 482 and 484 receive an input from diode 318 (FIG. 7) through resistors 492, 494 and 496, respectively. Resistors 492, 494 and 496 function in a manner similar to resistor 316 (FIG. 7) to render FETs 480, 482 and 484 responsive to the disengage signal generated in the failure management circuitry (FIG. 7).

Tracking loop 450 is included within each of the loops of the present four loop actuation system and operates with the additional circuitry illustrated in FIG. 7 as previously described.

While several embodiments of the invention, together with modifications thereof, have been described in detail herein and shown in the accompanying drawings, it will be evident that various further modifications and changes are possible without departing from the scope of the invention.

We claim:

1. A multiple loop control system providing a single composite output, comprising:
   a plurality of actuators, each actuator receiving at least two separate control signals and generating an output interconnected with the output of all other actuators in the plurality to provide a single composite output;
   a plurality of control loops, at least one connected to each of said actuators, each control loop responsive to an individual input signal and generating one of said control signals to one of the actuators;
   failure monitoring means connected to each of said actuators and the control loops to monitor the operation thereof, said failure monitoring means including means responsive to a monitor signal from each actuator, and means responsive to the monitor signal from one actuator having a difference from the monitor signals for the other actuators above a first threshold level to generate a disengage signal to one of the actuators for a failure condition, said failure monitoring means further including means for detecting a hard-type failure and inert-type failure and means for generating the disengage signal at a lower threshold level for an inert-type failure than for a hard-type failure; and
   said failure monitoring means further including means connected to each of said plurality of control loops for isolating each of said plurality of control loops from each other.

2. The multiple loop control system of claim 1 wherein said isolating means includes:
   switch means for interconnecting the output of one of said plurality of control loops to each of the other ones of said plurality of control loops.

3. The multiple loop control system of claim 1 wherein each actuator includes a servo valve with the output of each servo valve interconnected to provide the single composite output.

4. The multiple loop control system of claim 3 wherein each servo valve is of the electrohydraulic type including a valve coil and the output of each control loop provides a control signal to one of the valve coils.

5. The multiple loop control system of claim 4 wherein each electrohydraulic servo valve includes a position transducer generating a monitor signal to the failure monitoring means.

6. An actuation system to control a hydraulic actuator, comprising:
   a plurality of electrohydraulic actuators, each actuator including at least two servo valves each having a valve coil receiving an independent control signal, the sum of the outputs of each actuator combine to provide an output varying with the combination of the individual control signals;
   a plurality of control loops, one for each valve coil, and responsive to individual input signals and generating the control signal to one of the valve coils;
   a position transducer in each servo valve and responsive to the servo valve position and generating a feedback signal;
   failure monitoring means connected to each of the control loops and responsive to the individual feedback signals to monitor the operation of each actuator and disengage a control loop upon detection of a failure; and said failure monitoring means further including means connected to each of said plurality of control loops for isolating each of said plurality of control loops from each other.

7. The actuation system to control a hydraulic actuator of claim 6 wherein the failure monitoring means includes means responsive to a preset differential between one of the feedback signals and the remaining feedback signals to generate a disengage signal to one of the servo valves.

8. The actuation system to control a hydraulic actuator of claim 7 wherein said failure monitoring means includes means responsive to a preset differential between one of the feedback signals and the remaining feedback signals to generate a differential signal, and means responsive to a preset differential signal above a threshold level to generate the disengage-signal to the one servo valve.

9. The actuation system to control a hydraulic actuator of claim 6 wherein said failure monitoring means includes a time delay connected to said means responsive to the preset differential signal above a threshold level to delay the generation of the disengage signal for a predetermined time interval.

10. A four loop actuation system to control a hydrualic actuator, comprising:

four electrohydraulic servo valves, one for each loop of the actuation system, each servo valve providing a drive signal to the hydraulic actuator;

each servo valve including a valve coil receiving an independent control signal to actuate the interconnected servo valve;

four control loops, one for each valve coil and responsive to individual input signals and generating the control signal to the interconnected valve coil;

a position transducer connected to each electrohydraulic servo valve and responsive to valve position to generate a feedback signal;

failure monitoring means connected to each of the control loops and responsive to the individual feedback signals to monitor the operation of each loop and disengage a control loop upon detection of a failure; and said failure monitoring means further including switch means connected to each of said control loops for isolating one of said four control loops from the other three of said four control loops.

11. The four loop actuation system of claim 10 wherein said failure monitoring means includes means responsive to a preset differential between one of the feedback signals and the remaining three feedback signals to generate a disengage signal to one of the control loops.

12. The four loop actuation system of claim 11 wherein said failure monitoring means further includes means responsive to a preset differential above a threshold level to generate the disengage signal to the one loop only when the differential exceeds the threshold.

13. The four loop actuation system of claim 11 wherein said failure monitoring means includes time delay means responsive to the disengage signal to delay the connection of the disengage signal to the one loop for a predetermined time interval.

14. The four loop actuation system of claim 13 wherein said failure monitoring means includes means for detecting a hard-type failure and an inert-type failure, and wherein said means responsive to the preset differential above a threshold level generates the disengage signal for an inert-type failure at a lower threshold level than for a hard-type failure.

15. A multiple control loop system providing a single composite output, comprising:

a plurality of actuators, each actuator receiving at least two separate control signals and generating an output interconnected with the outputs of all other actuators of the plurality to provide a single composite output;

a plurality of control loops, at least one connected to each of said actuators, each control loop responsive to an individual input signal and generating one of said control signals to one of the actuators;

failure monitoring means connected to each of said actuators and the control loops to monitor the operation thereof and provide a disengage signal to one of the control loops for a failure condition, said failure monitoring means further including means for generating an alignment signal for each control loop to align the actuators; and said failure monitoring means further including means connected to each of said plurality of control loops for isolating each of said plurality of control loops from each other.

16. The multiple control loop system of claim 15 wherein said isolating means includes:

switch means for interconnecting the output of one of said plurality of control loops to each of the other ones of said plurality of control loops.

* * * * *

UNITED STATES PATENT AND TRADEMARK OFFICE
CERTIFICATE OF CORRECTION

PATENT NO. : 4,542,679

DATED : September 24, 1985

INVENTOR(S) : Milford R. Murphy and Delbert E. Haskins

It is certified that error appears in the above-identified patent and that said Letters Patent is hereby corrected as shown below:

Column 1, line 34, before "signals for", insert --control--.
Column 3, line 19, delete "signal" and insert --signals--.
Column 11, line 31, after "The resistor" insert --311--.

Signed and Sealed this

Sixth Day of May 1986

[SEAL]

Attest:

DONALD J. QUIGG

Attesting Officer

Commissioner of Patents and Trademarks